United States Patent Office 3,159,598
Patented Dec. 1, 1964

3,159,598
STABILIZATION OF POLYOLEFINS
Robert Bruce MacFarlane, Sarnia, Ontario, Canada, assignor to Polymer Corporation Limited, Sarnia, Ontario, Canada, a body corporate
No Drawing. Filed Sept. 6, 1960, Ser. No. 53,882
Claims priority, application Canada, Sept. 16, 1959, 782,568
3 Claims. (Cl. 260—45.9)

This invention relates to a method for treating polymers of olefinic compounds which have been prepared using catalysts containing heavy metal compounds, to improve their properties with regard to colour and degradation on storage and during subsequent shaping and forming operations, and to compositions thereby obtained. In particular, it relates to a method for converting the catalyst residues to inactive products which may then be allowed to remain in the polymer.

Various olefins such as ethylene, propylene, butylene, butadiene, isoprene, styrene and the like can be polymerized at relatively low pressures and temperatures to produce high molecular weight polymers and copolymers using a process involving a catalyst mixture of an organo-metallic reducing agent and reducible compounds of heavy metals. This process is usually carried out in the presence of an organic solvent such as pentane, hexane, benzene and the like at temperatures between 0° C. and 100° C.

The process permits the production of polymers with controlled molecular structure. In other words, it is possible using this process to produce polymers having desired structures which result in highly desired properties. For example, polyethylene can be prepared to have a higher density and higher melting point than that produced by previously used processes. Isoprene can be polymerized to produce a polymer having essentially all of the units in the cis-1,4 configuration and resulting in properties almost identical with natural rubber, or it can be polymerized to a polymer having a predominance of units in the trans-1,4 configuration. The polymerization of butadiene can be similarly directed and polypropylene can be produced which forms highly desirable films and filaments. The particular molecular structure obtained depends upon the particular combination of reducing agent and reducible compound used.

The reducing agents which are employed in the catalyst are in general organo-metallic compounds of metals of Groups I, II and III of the Periodic System, the most useful being those of heavy metals of Group IIIA of the Periodic System including various aluminum trialkyls such as aluminum trimethyl, aluminum triethyl, aluminum tripropyl and higher aluminum trialkyls as well as dialkyl aluminum monohalides, monoalkyl aluminum dihalides and dialkyl aluminum hydrides. While aluminum is the most common metallic component of the reducing agent, it may be substituted by other metals such as gallium, indium or thallium. The reducible compounds which are generally used are compounds of the heavy metals of Groups IV–B, V–B and VI–B of the Periodic System and the preferred metals are titanium, zirconium, vanadium, uranium, thorium and chromium although the remaining metals of the sub-groups can also be used. The compounds which are usually employed include halides, complex halides, oxyhalides, alkoxides, acetates, acetyl acetonates and the like. The catalyst components form a very active mixture and the amount used to effect polymerization varies from less than one percent to a few percent based on the olefinic materials being polymerized.

The polymerization reaction is usually stopped at the desired point by the addition of an alcohol, ketone or some other compound containing a labile hydrogen. The product may be separated from the reaction mass in a variety of ways. For example, it may be washed, while in a swollen condition, with alcohol or alcohol-diluent mixtures followed by a heating step to separate unpolymerized monomer, diluent and alcohol. Or the stopped reaction product may be added to warm water which causes evaporation of the unreacted monomer and diluent leaving the product in the form of a slurry in water from which it may be recovered by filtration.

While these methods of treating the polymerization products usually are effective in destroying the catalytic activity of the catalyst components and in removing some of the residues from the products, a certain amount of such residues remain and these frequently cause degradation of the polymer when present for extended periods during storage and under the influence of the heat applied during molding or shaping operations. Furthermore, these catalyst residues are coloured and impart an undesirable appearance to the polymer. For example, cis-polyisoprene prepared using a catalyst formed by admixing an aluminum trialkyl and a titanium tetrahalide and containing traces of catalyst residue is brownish in colour and degrades so readily on storing and compounding that it is difficult to produce a vulcanizate having a gum tensile strength above about 2000 p.s.i. The conventional antioxidants which are normally employed to stabilize rubbery polymers against degradation are ineffective in preventing the degradation caused by these catalyst residues. The actual cause of the degradation is not known although it is believed that when alcohol or water are used to stop the reaction, there is produced a significant amount of hydrogen halide as well as salts of titanium which are also acidic in nature. It appears that these acidic compounds cause degradation of the polymer and under some conditions cause cyclization. For example, hydrogen chloride when present in polyisoprene, causes rapid cyclization in the absence of air and rapid degradation in the presence of air.

It is the object of the present invention to provide an improved method for the recovery of polymers prepared using a catalyst formed by admixing an organo-metallic reducing agent and a reducible compound of a heavy metal.

It is a further object of the present invention to stabilize or inactivate the catalyst residues of heavy metal compounds contained in polymers of olefinic compounds.

It is a still further object to convert such catalyst residues to inactive materials which may then be allowed to remain in the polymer as an inert filler.

The objects of the invention may be accomplished by the method of stabilising polymers of olefinic compounds which contain residues of a catalyst consisting of an organo-metallic reducing agent and a reducible compound of a heavy metal, which comprises treating the polymer with a hydrazine. In its more specific aspects, the invention applies to such polymers which have been produced using reducible compounds of the heavy metals of Groups IV–B, V–B and VI–B of the Periodic System. The Periodic Table referred to is that shown in Handbook of Chemistry and Physics, Chemical Rubber Publishing Company, Cleveland, Ohio, 33rd edition (1951).

The hydrazines which may be used in the practice of the invention are hydrazine itself as well as alkyl or aryl substituted hydrazines. Thus the compounds concerned may be represented by the general formula $RR^1NNR^2R^3$ in which $R$, $R^1$, $R^2$ and $R^3$ are selected independently from the group consisting of hydrogen, alkyl hydrocarbon radicals and aryl hydrocarbon radicals. The hydrazines containing the alkyl hydrocarbon radicals may be any of the primary, secondary or tertiary compounds. It is generally preferred that the alkyl radical should be one containing 1–4 carbon atoms. The preferred compounds are hydrazine, methyl hydrazine, ethyl hydrzine and phenyl hydrazine.

In one form of the present invention, the polymerization reaction may be stopped by the direct addition of the hydrazine to the polymerization reactor followed by recovery and finishing of the polymer. In this process the catalyst residue is converted to an insoluble solid which may be allowed to remain in the polymer product as an inert filler. The insoluble solids are light in colour and therefore are not objectionable especially in polymers which are conventionally mixed with pigments or fillers in the production of end products.

In another form of the invention, the polymerization reaction may be stopped in a conventional manner by the addition of a liquid such as an alcohol, ketone or other liquid containing a labile hydrogen atom. The catalyst residues which are formed in this process may then be converted to insoluble solids by the addition of a hydrazine in accordance with the present invention. Alternatively a portion of the catalyst residues may first be extracted from the product by washing with an excess of suitable liquid such as ethanol and the unextracted residues remaining in the product converted to insoluble solids by the addition of a hydrazine. Such an extraction step reduces the amount of the insoluble solid contained in the final polymer.

The hydrazine compound may be added in the most convenient form depending upon the particular compound used and the point of addition. Since such compounds are dangerous and difficult to handle in pure form, it is most convenient to add them in solution in a suitable solvent such as water or alcohol although they may be added in pure form if suitable precautions are taken. Hydrazine itself is more stable in the form of hydrates and in the present application the term "hydrazine" is intended to include such hydrates. If the hydrazine compound is added to the polymer product as a solution in water or alcohol, a small amount of the catalyst reacts with water or alcohol to form acidic materials. However the amount of such acidic materials appears to be small and in any event they react rapidly with the hydrazine compound to form inactive compounds.

Once the polymerization reaction has been stopped and the metal salts of the catalyst system converted to the inactive forms, the polymer may be purified and finished in any desired manner. For instance, it may be heated to remove unreacted monomer and diluent and to recover dry polymer. Or it may be formed into a slurry in water, alcohol, acetone or other suitable liquid from which the polymer may be separated by settling or filtration.

The amount of the hydrazine compound which should be added in the practice of the present invention is not critical although it is preferable that an excess be added in order that all of the heavy metal compounds may be converted to insoluble salts. Although lower quantities of the hydrazine compound will form an insoluble salt with a portion of the heavy metal compounds and produce a polymer having improved properties, it is preferred for best results that the quantity added should be at least three times, on a molar basis, the total metal present in the catalyst system, that is, at least three times the sum of the metal added in the reducing agent and in the reducible heavy metal compound. The excess present is driven off in gaseous form during the heating steps in the subsequent conventional finishing operations.

The advantages of the present invention can be more readily understood by first considering the following experiment which illustrates the conventional method of finishing polymers of olefinic compounds which have been prepared using catalysts formed by mixing organo-metallic reducing agents and compounds of heavy metals:

EXPERIMENT A

Isoprene was polymerized in an agitated ten gallon polymerization reactor using the following polymerization recipe in which the quantities are given in pounds:

| | |
|---|---|
| Pentane | 35.28 |
| Aluminum triisobutyl (1 molar solution in pentane) | 1.22 |
| Titanium tetrachloride (1 molar solution in pentane) | 1.40 |
| Isoprene | 4.3 |

The ingredients of the recipe were added in the order shown to the reactor which had been thoroughly dried. The polymerization reaction was allowed to proceed at 55° F. for 22 hours to a conversion of 95%. Then the reaction was stopped by the addition of a solution of 12.2 grams of 2,5-ditertiarybutyl hydroquinone and 12.2 grams of Age-Rite in 1.5 gallons of ethanol. The hydraquinone and Age-Rite are antioxidants for rubber, the latter being polymerized trimethyldihydroquinoline. The reactor contents, which were in the form of a very viscous liquid, were then removed to another container where further ethanol was added with agitation. The polymer precipitated in the form of a crumb which was divided into portions A and B. A was washed by thoroughly stirring a slurry in aqueous ethanol and B was extracted twice by refluxing with a one percent solution of 2,5-ditertiarybutyl hydroquinone in ethanol. Both A and B were then dried in vacuum at room temperature for 20 hours and compounded on a laboratory mill having one inch rolls and a two inch space between the guides, using the following compounding recipe, quantities being expressed in grams:

| | |
|---|---|
| Polymer | 5.0 |
| 2,5-ditertiarybutyl hydroquinone | 0.050 |
| Stearic acid | 0.150 |
| Lecithin | 0.070 |
| Triethanolamine | 0.005 |
| Zinc oxide | 0.150 |
| Benzothiazyl disulfide | 0.050 |
| Sulphur | 0.125 |

Microtensile sheets of the compounds were cured by vulcanizing at 275° F. for times up to 50 minutes. The tensile strength of the vulcanizates was determined on an Instron tester using microdumbbells with the clamps moving at the rate of 20 inches per minute.

The maximum tensile values were found to be 850 p.s.i. for A and 2190 p.s.i. for B and were attained at cure times of 25 minutes and 12.5 minutes, respectively. This experiment shows that using the conventional method of finishing polymers prepared in this system, the physical properties of gum stocks are inferior to those for natural rubber and to those required for a satisfactory rubbery polymer. The tensile strength should be in excess of 2500 p.s.i. and preferably above 3000 p.s.i. Even a double extraction of the catalyst residue with ethanol only resulted in a tensile strength of 2190 p.s.i.

Having described the invention in general terms, it will be further illustrated by the following examples:

Example I

Isoprene was polymerized in a standard seven ounce crown capped polymerization bottle which was charged according to the following recipe:

| | Mls. |
|---|---|
| n-Pentane | 150 |
| Aluminum triisobutyl (1 M solution in heptane) | 3.0 |
| Titanium tetrachloride (1 M solution in heptane) | 2.5 |
| Isoprene | 10.0 |

The n-pentane was dried over calcium hydride prior to charging to the bottle which had previously been thoroughly dried and flushed with nitrogen. The isoprene was dried by passing it over alumina and calcium hydride. After adding the catalyst ingredients and monomer in the order shown above, the bottle was capped and maintained at 13° C. overnight (about 18 hours) while polymerization proceeded.

The polymerization was then terminated in accordance with the present invention by injecting 3.6 gms. of anhydrous hydrazine by means of a hypodermic syringe, shaking the bottle vigorously by hand and allowing the mixture to stand at room temperature for about 30 minutes. Ten mls. of a one percent solution of 2,5-ditertiary-butyl hydroquinone in ethanol was then injected by means of a hypodermic syringe and the polymer then recovered by pouring the contents of the bottle into a 400 ml. beaker containing 100 mls. of distilled water at about 70° C. to vaporize the pentane. The polymer was then cut into approximately ¼ inch cubes and washed twice in water at 70–75° C. and dried for one hour in a current of air heated to 70–80° C. The polymer was then compounded, cured and tested using the compounding recipe and testing method described in Experiment A. The maximum tensile strength was found to be 3680 p.s.i. and was obtained in a curing time of 12.5 minutes.

*Example II*

A second polymerization was carried out as described in Example I except that the polymerization reaction was terminated by the injection of 3.4 grams of anhydrous hydrazine dissolved in 5.5 grams of ethanol. The polymer was recovered as in Example I. On compounding and testing as in Example I, a vulcanizate was obtained having a maximum tensile strength of 3120 p.s.i.

*Examples III–VII*

Isoprene was polymerized in five bottles as described in Example I and the polymerization was stopped by the injection of hydrazine dissolved in various amounts of water and ethanol. The polymer was recovered as in Example I. The products were compounded and tested as in Example I and the results are shown in the accompanying table.

| Example No. | Mls. of Hydrazine | Mls. of Water | Mls. of Ethanol | Max. Tensile (p.s.i.) |
|---|---|---|---|---|
| III | 0.75 | 1.75 | 2.5 | 2,800 |
| IV | 1.5 | 3.5 | 5.0 | 3,600 |
| V | 1.5 | 3.5 | 5.0 | 3,850 |
| VI | 2.8 | 6.5 | 9.3 | 3,820 |
| VII | 3.0 | 7.0 | 10.0 | 3,900 |

It is evident from these results that a hydrazine compound can be used to deactivate the polymerization catalyst and subsequent recovery in the presence of water can be carried out without significant degradation of the polymer. It is also evident that the addition of the hydrazine compound need not precede the addition of water or alcohol in order to prevent the degradation of the polymer.

While the invention is used to advantage for deactivating a variety of catalyst residues, it is of particular advantage for treating a halogenated catalyst residue, especially when these are contained in polymers of conjugated diolefins such as polyisoprene and when the polymer is recovered in an aqueous process.

I claim:
1. The method of stabilizing residues of heavy metal catalyst compounds contained in polyisoprene produced with a catalyst formed by admixing an aluminum trialkyl and titanium halide which comprises treating the polymer containing said catalyst residues with an amount of a hydrazine selected from the group consisting of hydrazine, methyl hydrazine and ethyl hydrazine, the amount of the hydrazine being at least three moles per mole of the catalyst residues present in the polymer, and removing the unreacted excess of the hydrazine from the polymer.

2. The method of stabilizing residues of heavy metal catalyst compounds contained in polyisoprene produced with a catalyst formed by admixing an aluminum trialkyl and titanium tetrachloride which comprises treating the polymer containing said catalyst residue with an amount of a hydrazine selected from the group consisting of hydrazine, methyl hydrazine and ethyl hydrazine, the amount of the hydrazine being at least three moles per mole of the catalyst residues present in the polymer, and removing the unreacted excess of the hydrazine from the polymer.

3. The method according to claim 2 in which the polymer containing said catalyst residue is treated with hydrazine.

References Cited by the Examiner

UNITED STATES PATENTS

| 1,784,838 | 12/30 | Jones | 260—806 |
| 2,701,241 | 2/55 | Wood et al. | 260—45.9 |
| 2,837,536 | 6/58 | Fox | 260—569 |
| 2,889,310 | 6/59 | Tughan | 260—45.9 |
| 2,962,488 | 11/60 | Horne | 260—94.7 |
| 3,086,000 | 4/63 | Wargotz | 260—94.3 |

FOREIGN PATENTS

| 584,705 | 10/59 | Canada. |
| 1,180,634 | 1/59 | France. |

JOSEPH L. SCHOFER, *Primary Examiner.*

L. H. GASTON, WILLIAM H. SHORT, *Examiners.*